(12) United States Patent
Gavade et al.

(10) Patent No.: US 9,930,377 B2
(45) Date of Patent: Mar. 27, 2018

(54) METHODS AND SYSTEMS FOR CLOUD-BASED MEDIA CONTENT TRANSCODING

(71) Applicant: Verizon Patent and Licensing Inc., Arlington, VA (US)

(72) Inventors: Sameer Gavade, Irving, TX (US); Sanjay Ahuja, Irving, TX (US); Venkata S. Adimatyam, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/009,648

(22) Filed: Jan. 28, 2016

(65) Prior Publication Data

US 2017/0223394 A1 Aug. 3, 2017

(51) Int. Cl.

| | |
|---|---|
| H04N 7/173 | (2011.01) |
| H04N 21/2343 | (2011.01) |
| H04L 29/06 | (2006.01) |
| H04L 29/08 | (2006.01) |
| H04N 21/218 | (2011.01) |
| H04N 21/222 | (2011.01) |
| H04N 21/262 | (2011.01) |
| H04N 21/845 | (2011.01) |
| H04N 21/239 | (2011.01) |

(52) U.S. Cl.
CPC . *H04N 21/234309* (2013.01); *H04L 65/4084* (2013.01); *H04L 65/605* (2013.01); *H04L 67/1014* (2013.01); *H04N 21/2181* (2013.01); *H04N 21/222* (2013.01); *H04N 21/2393* (2013.01); *H04N 21/26258* (2013.01); *H04N 21/8455* (2013.01)

(58) Field of Classification Search
None
See application file for complete search history.

(56) References Cited

U.S. PATENT DOCUMENTS

| | | | |
|---|---|---|---|
| 2005/0138137 A1* | 6/2005 | Encarnacion | G06F 17/30887 709/217 |
| 2015/0324379 A1* | 11/2015 | Danovitz | G06F 17/30109 707/825 |
| 2016/0164941 A1* | 6/2016 | Kim | H04L 65/605 709/219 |

\* cited by examiner

*Primary Examiner* — Kunal Langhnoja

(57) ABSTRACT

An exemplary system for cloud-based media content transcoding includes a local media content server that records a media content program, divides the media content program into a plurality of program segments, generates a program segment playlist including pointers to the plurality of program segments, receives a request for a media content playback device to download the media content program, and transmits the program segment playlist to the media content playback device. The program segment playlist directs the media content playback device to request and download transcoded versions of the program segments from a cloud-based transcoding system located remotely from the local media content server. The cloud-based transcoding system accesses the program segments from the local media content server, and generates and transmits the transcoded versions of the program segments to the media content playback device.

20 Claims, 13 Drawing Sheets

METHODS AND SYSTEMS FOR CLOUD-BASED MEDIA CONTENT TRANSCODING

BACKGROUND INFORMATION

Media content providers (e.g., cable television providers, satellite television and/or radio providers, Internet service providers, etc.) provide media content programs including video, audio, and/or other media content to users such as subscribers of the media content providers' services. Commonly, a user accessing a particular media content program can use equipment located at the user's premises (e.g., a local media content server such as a digital video recorder or other set-top device) to record the media content program for later viewing. In some examples, the user may wish to view or listen to the recorded media content program using a playback device independent from the equipment used to record the media content program, or to do so in a different location from the user's premises where the recording of the media content program is stored. Accordingly, the media content provider may provide an option for the user to transfer the media content program from the equipment that recorded the media content program (e.g., the local media content server) to a separate playback device (e.g., a portable device such as a mobile phone, tablet device, laptop computer, etc.).

Before the media content program is downloaded and played back by the playback device, it may be desirable for data comprising the media content program to be transcoded and/or otherwise prepared for use on the playback device. For example, if the playback device is a portable device, the playback device may have reduced playback capabilities compared to the original device for which the media content program was recorded (e.g., a smaller screen, fewer audio speakers, etc.). As such, it may be desirable to convert the data comprising the media content program from a relatively high bit rate at which the media content program was recorded (e.g., 20 Megabits per second ("Mbps")) to a lower bit rate more suitable for playback on the portable device (e.g., 3 Mbps). Similarly, it may be desirable for the data to be reformatted for playback on the portable device (e.g. from a MPEG-2 transport stream ("MPEG-TS") format to an MPEG-4 Part 14 ("MP4") format).

However, waiting for the media content program to be transcoded and otherwise prepared for use on the playback device may create a significant inconvenience for the user. For example, high-quality data transcoding may be performed at just 1× playback speed, meaning that, if the media content program is one hour in length, the user may need to wait at least one hour from requesting to download the media content program to the playback device until the media content program is downloaded and ready for playback on the playback device.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
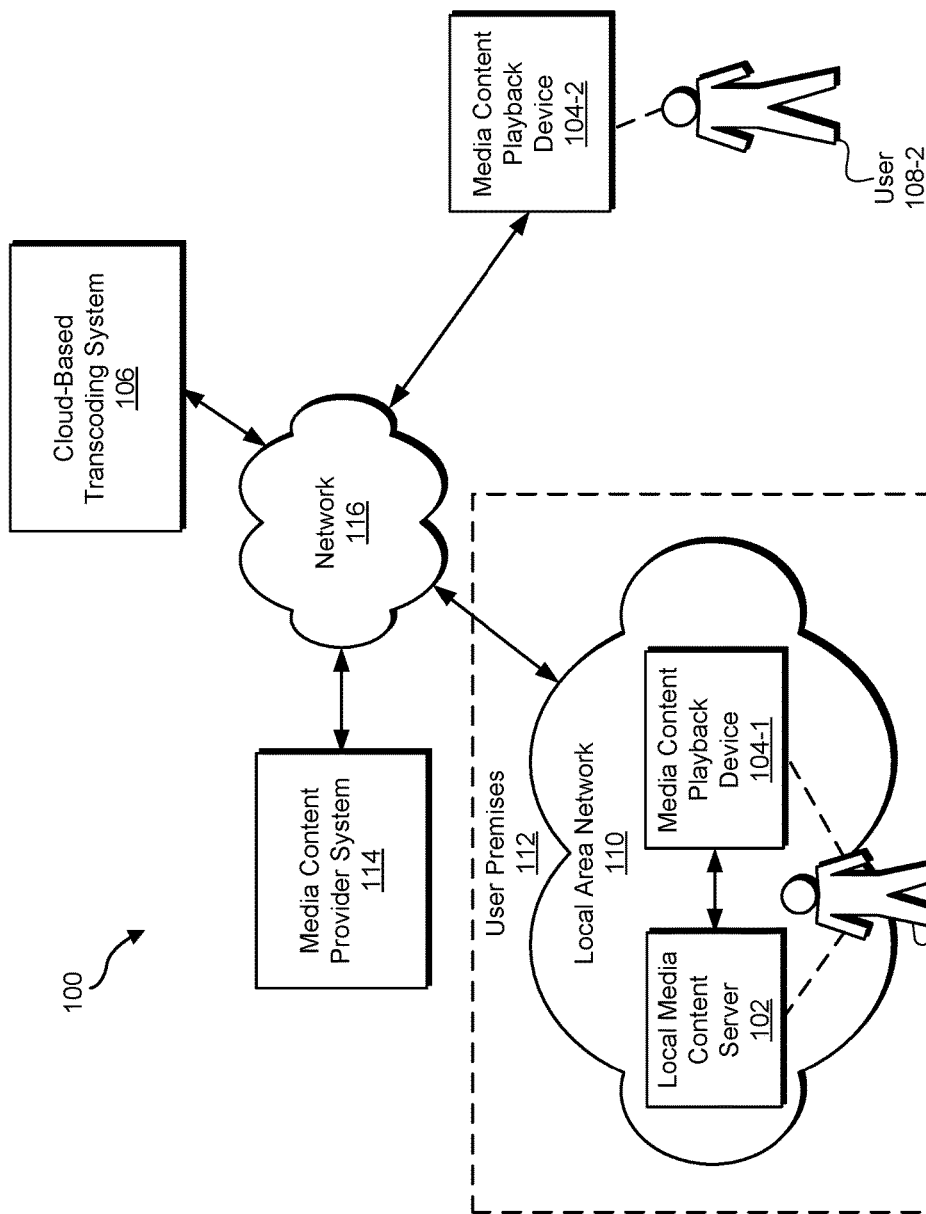
FIG. 1 illustrates an exemplary configuration in which embodiments of a local media content server, a media content playback device, and a cloud-based transcoding system operate together to perform exemplary cloud-based media content transcoding according to principles described herein.

Methods and systems for cloud-based media content transcoding are described herein. As will be illustrated below, a media content provider system may distribute a media content program to a local media content server (e.g., a digital video recorder ("DVR") or other set-top device) associated with a user (e.g., a subscriber associated with a media content provider service) at a user premises of the user (e.g., the user's home). The user may use the local media content server to view or listen to the media content program (e.g., using one or more stationary devices associated with the local media content server such as a television and/or home audio system). Additionally, the user may be associated with a media content playback device (e.g., a portable device such as a mobile phone, a tablet device, etc.), which the user may wish to use for viewing and/or listening to the media content program in addition or as an alternative to viewing and/or listening to the media content program using the stationary devices. For example, the user may wish to use the media content playback device to view and/or listen to the media content program in a location remote from the local media content server (e.g., away from home). The media content playback device may be communicatively coupled to the local media content server locally by a local area network at the user premises (e.g., a home network, an office intranet, etc.) or remotely by one or more networks external to the user premises (e.g., the Internet, a mobile carrier network, a provider network associated with the media content provider system, etc.).

In certain examples, the local media content server may record the media content program, divide the media content program into a plurality of program segments, each program segment comprising a different portion of the media content program, and generate a program segment playlist including pointers to the plurality of program segments of the media content program. The local media content server may receive a request (e.g., directly from the user or from the media content playback device) for the media content playback device to download the media content program. In response to the request, the local media content server may transmit to the media content playback device the program segment playlist including the pointers to the plurality of program segments of the media content program. The program segment playlist may be configured to cause the media content playback device to request, based on the pointers included in the program segment playlist, transcoded versions of the plurality of program segments of the media content program from a cloud-based transcoding system located remotely from the user premises. The program segment playlist may be further configured to cause the media content playback device to download the transcoded versions of the plurality of program segments from the cloud-based transcoding system after the cloud-based transcoding system has accessed the plurality of program segments from the local media content server and generated the transcoded versions of the plurality of program segments.

Offloading the burden of transcoding the media content program from a local media content server to a cloud-based transcoding system according to methods and systems described herein may provide significant advantages to the local media content server, to the media content playback device requesting the media content program, and/or to the user of the local media content server and/or the media content playback device. For example, by generating and transmitting the program segment playlist including pointers to the plurality of program segments of the media content program, rather than transcoding and transmitting the media content program itself, the processing burden on the local media content server may be significantly lightened. In some examples, the local media content server may not include hardware transcoding resources, which may simplify the design and/or lower the cost of the local media content server.

Another advantage of cloud-based media content transcoding as disclosed herein relates to the shortened time between when a request for a media content playback device to download a media content program from a local media content server is sent and when the media content program is downloaded to the media content playback device and ready for playback by the media content playback device. Because the cloud-based transcoding system may include a large number of hardware transcoding resources and the media content program may be broken into relatively small program segments (e.g., one-minute long program segments) that may be transcoded concurrently, the media content program may be transcoded by the cloud-based transcoding system in a small fraction of the time that may be required if a local media content server with limited hardware transcoding resources transcodes the media content program. For example, for a sixty-minute long media content program, the approximately sixty minutes of time that would be required by a local media content server with limited hardware transcoding resourced to perform a high-quality transcoding on the media content program to prepare the media content program for download and playback by the media content playback device may be shortened to approximately one minute of transcoding time because the cloud-based transcoding system may transcode sixty one-minute long program segments concurrently (i.e., simultaneously, or in parallel) in certain implementations.

The transcoding process may be performed in a manner that is transparent to the user such that the user is not aware of how the media content program is being transcoded or which device is performing the transcoding. However, one or more advantages of methods and systems described herein may be very apparent to the user because, where preparing and downloading a sixty-minute media content program onto a media content playback device once took sixty minutes, the same media content program may now, using methods and systems described herein, be prepared and downloaded onto the media content playback device in a significantly shorter amount time (e.g., in approximately one minute in certain implementations).

Various embodiments will now be described in more detail with reference to the figures. The disclosed methods and systems may also provide various other benefits that will be made apparent herein.

FIG. 1 illustrates an exemplary configuration 100 in which embodiments of a local media content server 102, one or more media content playback devices 104 (e.g., media content playback devices 104-1 and 104-2), and a cloud-based transcoding system 106 operate to perform exemplary cloud-based media content transcoding. Specifically, as shown in FIG. 1, local media content server 102 may be associated with one or more users 108 (e.g., users 108-1 and/or 108-2) and may be communicatively coupled to media content playback devices 104, which may also each be associated with users 108 (e.g., media content playback device 104-1 with user 108-1 and media content playback device 104-2 with user 108-2). As shown, local media content server 102 may be communicatively coupled to media content playback device 104-1 via a local area network 110 associated with (e.g., located at) a user premises 112. Local area network 110 may be communicatively coupled to a media content provider system 114 through a network 116, allowing, for example, local media content server 102 to receive media content data (e.g., one or more media content programs) from media content provider system 114 via network 116 and local area network 110. Cloud-based transcoding system 106 and one or more additional media content playback devices such as media content playback device 104-2 may also be communicatively coupled to local media content server 102 and/or to other devices on local area network 110 via network 116 and local area network 110. Each of the components of configuration 100 will now be described in detail.

Local media content server 102 may include any suitable device that facilitates receiving, processing, and/or playing back media content data at user premises 112. For example, local media content server 102 may include a set-top device connected to other devices such as a television and/or audio system in a home media setup (e.g., a home theater setup). In one specific example, local media content server 102 may comprise a Verizon Hybrid QAM/IP Video Media Server ("VMS") such as a VMS1100, configured for use with a media content provider service such as Verizon's FIOS media content service. As will be described in more detail below, local media content server 102 may receive and/or process media content data from media content provider system 114. For example, upon receiving a media content program from media content provider system 114, local media content server 102 may record the media content program and divide the media content program into a plurality of program segments each including a different portion of the media content program. For example, if the media content program is a sixty minute long media content program, local media content server 102 may divide the media content program into sixty separate one-minute long program segments that each include a different portion of the media content program such that, when combined together, the program segments form the entire media content program. In certain embodiments, the media content program may already be divided when local media content server 102 receives the media content program. For example, rather than being divided into program segments by local media content server 102, the media content program may be previously divided into program segments (e.g., by media content provider system 114) before local media content server 102 receives the media content program.

After receiving and/or dividing the media content program into the program segments, local media content server 102 may generate a program segment playlist including pointers to each of the plurality of program segments of the media content program. As will be described in more detail below, the pointers may include a uniform resource locator ("URL") having a hostname that corresponds to a local proxy server facility running on one of media content playback devices 104 and a file identifier corresponding to a respective program segment in the plurality of program segments of the media content program.

Local media content server 102 may also receive a request for one of media content playback devices 104 to download the media content program. In some examples, local media content server 102 may receive the request directly from one of users 108. In other examples, one of users 108 may request the download of the media content program from the respective media content playback device 104 of the user 108 (e.g., media content playback device 104-1 for user 108-1 or media content playback device 104-2 for user 108-2), and local media content server 102 may receive the request for the media content playback device 104 to download the media content from the respective media content playback device 104 itself.

Local media content server 102 may record the media content program, divide the media content program into the plurality of program segments, generate the program segment playlist, and receive the request for the media content playback device 104 to download the media content program in any order that may serve a particular implementation. For example, in some embodiments, local media content server 102 may receive the request for the media content playback device 104 to download the media content program subsequent to recording the media content program, and may divide the media content program and generate the program segment playlist in response to the request. In another example, local media content server 102 may automatically divide the media content program and generate a program segment playlist for each media content program that is recorded, and the request to download the media content program may be received subsequent to recording the media content program, dividing the media content program, and generating the program segment playlist.

Subsequent and/or in response to receiving a request for one of media content playback devices 104 to download the media content program, local media content server 102 may transmit to the media content playback device 104 the program segment playlist including the pointers to the plurality of program segments of the media content program. As will be described in more detail below, the program segment playlist transmitted by local media content server 102 may be configured to cause the media content playback device 104 to request transcoded versions of the plurality of program segments of the media content program based on the pointers included in the program segment playlist. For example, the program segment playlist may cause the media content playback device 104 to request the transcoded versions of the plurality of program segments from cloud-based transcoding system 106, which may be located remotely from user premises 112. The program segment playlist transmitted by local media content server 102 may be further configured to cause the media content playback device 104 to download the transcoded versions of the plurality of program segments from cloud-based transcoding system 106 after cloud-based transcoding system 106 has accessed the plurality of program segments from local media content server 102 and generated the transcoded versions of the plurality of program segments.

Media content playback devices 104 may be used by users 108 to access and playback media content received from local media content server 102. To this end, media content playback devices 104 may each include or be implemented by any suitable media content playback device such as by a mobile or wireless device (e.g., a smartphone, a tablet device, a mobile reader, etc.), a personal computer, a personal digital assistant device, a gaming device, a television device, a set-top device, a home audio device, and/or any other suitable media content playback device configured to facilitate receiving and/or playing back media content.

In certain examples, media content playback devices 104 may be configured to allow users 108 to select respective media content programs that users 108 may wish to download onto their respective media content playback devices 104. When media content playback devices 104 receive user input from users 108 to download particular media content programs, media content playback devices 104 may send requests to local media content server 102 to download the requested media content programs. As shown in FIG. 1, media content playback device 104-1 may be located at user premises 112 and may be communicatively coupled to local media content server 102 via local area network 110. As such, media content playback device 104-1 may send a request to download a media content program via local area network 110 and, in response, may receive a program segment playlist including pointers to a plurality of program segments of the media content program from local media content server 102 via local area network 110. Conversely, as further shown in FIG. 1, media content playback device 104-2 may be located remotely from user premises 112 and may not be on local area network 110. Rather, media content playback device 104-2 may be communicatively coupled with local area network 110 and local media content server 102 via network 116. Thus, media content playback device 104-2 may send a request to download a media content program via network 116 and, in response, may receive a program segment playlist including pointers to a plurality of program segments of the media content program from local media content server 102 via network 116.

In certain examples, media content playback devices 104 may determine that transcoded versions of the program segments referenced within the program segment playlist received by media content playback devices 104 from local media content server 102 in response to the requests to download respective media content programs are already available to media content playback devices 104. For example, the transcoded media content may have been stored within a storage resource of media content playback devices 104 during a previous instance when users 108 requested and downloaded the media content programs.

In other examples, as will be described in more detail below, the program segment playlist received by media content playback devices 104 from local media content server 102 in response to the requests to download respective media content programs may configure media content playback devices 104 to request transcoded versions of the pluralities of program segments of the media content programs from cloud-based transcoding system 106 and to download the transcoded versions of the pluralities of program segments from cloud-based transcoding system 106 after cloud-based transcoding system 106 has accessed the pluralities of program segments from local media content server 102 and generated the transcoded versions of the pluralities of program segments.

Users 108 may be associated with local media content server 102, media content playback devices 104, and user premises 112 in any suitable way. For example, users 108 may own or lease local media content server 102 as part of a media content provider service that users 108 subscribe to, may each own their respective media content playback devices 104, and may reside in user premises 112, which may represent a home of users 108. Thus, even though user 108-2 may be located remotely from user premises 112, user 108-2 may still, like user 108-1, be associated with local media content server 102 (e.g., by owning or paying for and/or living with someone who owns or pays for local media content server 102) and/or with user premises 112 (e.g., by living at user premises 112). In other examples, users 108 may work, attend school, patronize, or otherwise associate with user premises 112, which may represent, respectively, a workplace of users 108, a school of users 108, a restaurant or coffee shop patronized by users 108, or the like. Similarly, users 108 may have any suitable relationship with one another. For example, users 108 may be immediate family members (e.g., spouses, parents and children, etc.) who live together at user premises 112 and jointly pay for a media content provider service with which local media content server 102 is associated. Conversely, only one of users 108 (e.g., user 108-1) may be directly associated with user premises 112 and/or pay for the media content provider service associated with local media content server 102, while other users 108 (e.g., user 108-2) may be given a privilege (e.g., from user 108-1) to access media content programs from local media content server 102.

Cloud-based transcoding system 106 may include any suitable computing devices (e.g., computer servers) and/or other hardware or software (e.g., hardware transcoding resources) located remotely from user premises 112 and configured to provide a transcoding service for media content programs recorded by local media content server 102 and/or other local media content servers associated with other user premises (not shown). In some examples, cloud-based transcoding system 106 may be associated with a cloud-based transcoding service provided by a media content provider that also provides a media content provider service associated with local media content server 102. As such, cloud-based transcoding system 106 may be included within and/or related to media content provider system 114 in any suitable way.

Cloud-based transcoding system 106 may be configured to perform any media content transcoding functions and/or functions related to and/or supportive of transcoding functions that may serve a particular implementation. For example, cloud-based transcoding system 106 may receive (e.g., via network 116) requests for transcoded versions of pluralities of program segments of media content programs from either or both of media content playback devices 104. Prior to receiving these transcoding requests or in response to the transcoding requests, cloud-based transcoding system 106 may access the plurality of program segments from local media content server 102. For example, cloud-based transcoding system 106 may establish a connection (e.g., a socket connection) with local media content server 102, and may download the plurality of program segments from local media content server 102. Subsequently, cloud-based transcoding system 106 may generate the transcoded versions of the plurality of program segments of the media content program by using, for example, one or more hardware transcoding resources of cloud-based transcoding system 106. In some examples, cloud-based transcoding system 106 may generate the transcoded versions of at least two program segments of the plurality of program segments concurrently (e.g., in parallel). In response to the requests, cloud-based transcoding system 106 may transmit the transcoded versions of the plurality of program segments to the media content playback device 104 that requested the transcoded versions of the program segments.

Media content provider system 114 may be associated with (e.g., provided and/or managed by) a media content service provider (e.g., a network service provider, a cable service provider, a satellite service provider, an Internet service provider, etc.) and may be configured to provide media content programs to subscribers of a media content provider service (e.g., a cable television service, etc.) by way of local media content server 102. For example, media content provider system 114 may provide access to a variety of media content programs associated with local television channels, network television channels, Internet television channels, cable television channels, premium channels, satellite television channels, Internet and satellite radio stations, pay-per-view programs, video conferences, and other suitable media content sources. To this end, local media content server 102 may request access to a particular media content program (e.g., by selecting the media content program, by selecting a particular channel that is currently playing the media content program, etc.) and, in response, media content provider system 114 may transmit data representative of the media content program to local media content server 102.

In some examples, media content provider system 114 may divide the media content program into a plurality of program segments, each program segment comprising a different portion of the media content program. In other examples, media content provider system 114 may transmit the requested media content program as a whole and local media content server 102 may record the media content program and divide the media content program into the plurality of program segments.

Local media content server 102, media content playback devices 104, cloud-based transcoding system 106, and media content provider system 114 may communicate with one another using any suitable communication technologies, devices, media, and/or protocols supportive of data communications, including, but not limited to, socket connections, Ethernet, data transmission media, communication devices, Transmission Control Protocol ("TCP"), Internet Protocol ("IP"), File Transfer Protocol ("FTP"), Telnet, Hypertext Transfer Protocol ("HTTP"), HTTPS, Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), 4G Long Term Evolution ("LTE"), Voice over IP ("VoIP"), Voice over LTE ("VoLTE"), WiMax, Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

As shown, local media content server 102 and media content playback device 104-1 may be communicatively coupled with one another via local area network 110, and local area network 110 may be communicatively coupled with media content playback device 104-2, cloud-based transcoding system 106, and media content provider system 114 by way of network 116. Local area network 110 may include any suitable networking equipment and utilize any suitable protocols. In some examples, local area network 110 may include wired (e.g., Ethernet, Multimedia over Coax Alliance ("MoCA")) connections between local media content server 102 and media content playback device 104-1. Additionally or alternatively, local area network 110 may include a wireless connection based on an IEEE 802.11 standard ("Wi-Fi") or other wireless connections between local media content server 102 and client device 104-1. In some examples, extension devices (e.g., Wi-Fi boosters, repeaters, extenders, etc.) may be employed within local area network 110.

Network 116 may include any provider-specific network (e.g., a cable or satellite carrier network or a mobile telephone network), the Internet, wide area network, or any other suitable network. Data may flow between local area network 110, media content playback device 104-2, cloud-based transcoding system 106, and media content provider system 114 by way of network 116 using any communication technologies, devices, media, and protocols as may serve a particular implementation. While only one network 116 is shown to interconnect local area network 110, media content playback device 104-2, cloud-based transcoding system 106, and media content provider system 114 in FIG. 1, it will be recognized that these devices and systems may intercommunicate by way of multiple interconnected networks as may serve a particular implementation.

Figure 2:
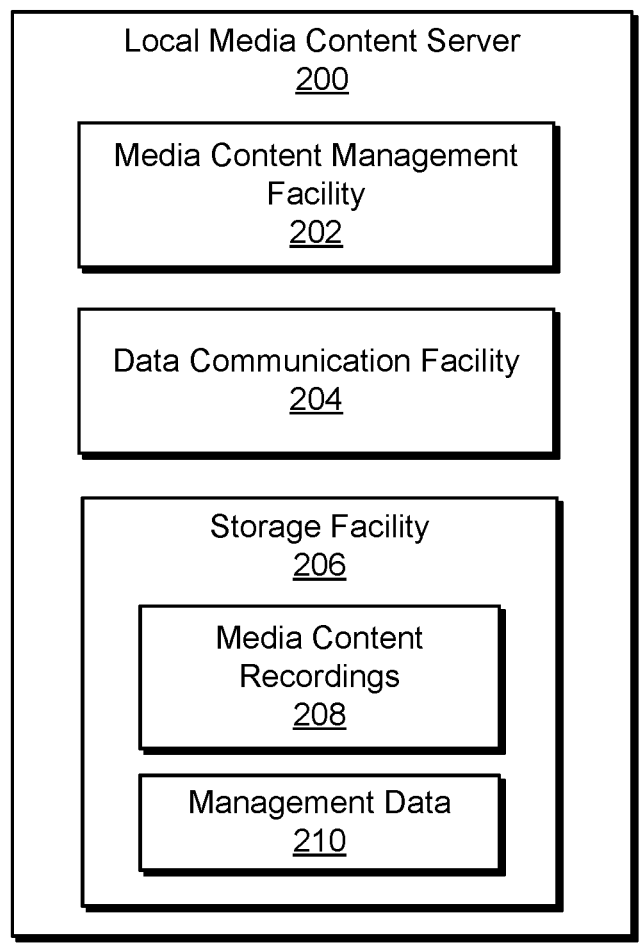
FIG. 2 illustrates an exemplary local media content server located at a user premises and configured to facilitate cloud-based media content transcoding according to principles described herein.

FIG. 2 illustrates an exemplary local media content server 200 that may be located at a user premises and configured to facilitate cloud based media content transcoding according to methods and systems described herein. Local media content server 200 may be similar or the same as local media content server 102 and may similarly be located at a user premises (e.g., user premises 112) with connections to other devices and systems as described above in relation to FIG. 1. As shown, local media content server 200 may include, without limitation, a media content management facility 202, a data communication facility 204, and a storage facility 206 selectively and communicatively coupled to one another. It will be recognized that although facilities 202-206 are shown to be separate facilities in FIG. 2, any of facilities 202-206 may be combined into fewer facilities, such as into a single facility, or divided into more facilities as may serve a particular implementation.

Storage facility 206 may maintain media content recordings 208 and management data 210 generated and/or used by media content management facility 202 and/or data communication facility 204. For example, media content recordings 208 may include recordings of media content programs received by local media content server 200 (e.g., from a media content provider system such as media content provider system 114 in FIG. 1). Media content programs may be stored within media content recordings 208 as entire media content programs or as a plurality of individual program segments after the media content programs have been divided. Management data 210 may include any data related to operations performed by local media content server 200. For example, management data 210 may include software instructions for requesting, receiving, and/or playing back media content programs, software instructions for dividing media content programs into pluralities of program segments, software instructions for generating program segment playlists including pointers to the plurality of program segments of the media content program, software instructions for transmitting the program segment playlists, and/or other information for processing and/or otherwise handling media content programs requested by a user of local media content server 200.

Media content management facility 202 may perform one or more processing operations on media content requested by a user of local media content server 200 such as encoding, decoding, transcoding, rendering, and/or otherwise processing media content program data for playback by a media content playback system directly connected to or included within local media content server 200 (e.g., by one or more video playback devices and audio playback devices included within a home theater system connected to local media content server 200). Media content management facility 202 may also prepare media content programs to be viewed and/or listened to using other media content playback devices such as media content playback devices 104, described above in relation to FIG. 1.

To this end, media content management facility 202 may include hardware transcoding resources (e.g., dedicated transcoding processors running dedicated transcoding software) for transcoding media content programs in preparation for transmitting the media content programs to other media content playback devices. Conversely, in certain examples described in more detail below, media content management facility 202 may employ no dedicated hardware transcoding resources but, rather, may rely on a cloud-based transcoding service implemented by a cloud-based transcoding system (e.g., cloud-based transcoding system 106 of FIG. 1) with dedicated hardware transcoding resources to transcode media content programs in preparation for playback by other media content playback devices. As such, media content management facility 202 may transmit media content data to the cloud-based transcoding system so that the cloud-based transcoding system may perform the transcoding of the media content programs. More specifically, as will be described in more detail below, media content management facility 202 may divide media content programs into pluralities of individual program segments, generate program segment playlists including pointers to the pluralities of individual program segments of the media content programs, and transmit the program segment playlists to the media content playback devices. Then, so that the cloud-based transcoding system may provide transcoded versions of the program segments to the media content playback devices when requested to do so by the media content playback devices, the cloud-based transcoding service may access non-transcoded versions of the program segments of the media content program from local media content server 200. Media content management facility 202 may facilitate transmitting the program segments in response to such requests from the cloud-based transcoding system.

Data communication facility 204 may perform any suitable communication operations for proper functionality of local media content server 200. For example, as will be described in more detail below, data communication facility 204 may facilitate receiving requests from a user (e.g., one of users 108 of FIG. 1) or from a media content playback device associated with the user (e.g., one of media content playback devices 104 of FIG. 1) to access, play back, and/or record a particular media content program. Data communication facility 204 may also facilitate the establishment of a connection (e.g., a socket connection) with a cloud-based transcoding system and the downloading of a plurality of program segments of the media content program from local media content server 200 to the cloud-based transcoding system. Data communication facility 204 may also facilitate sending program segment playlists and/or other data to media content playback devices (e.g., media content playback devices 104). The operations performed by media content management facility 202 and data communication facility 204 within local media content server 200 will be described in more detail below.

Figure 3:
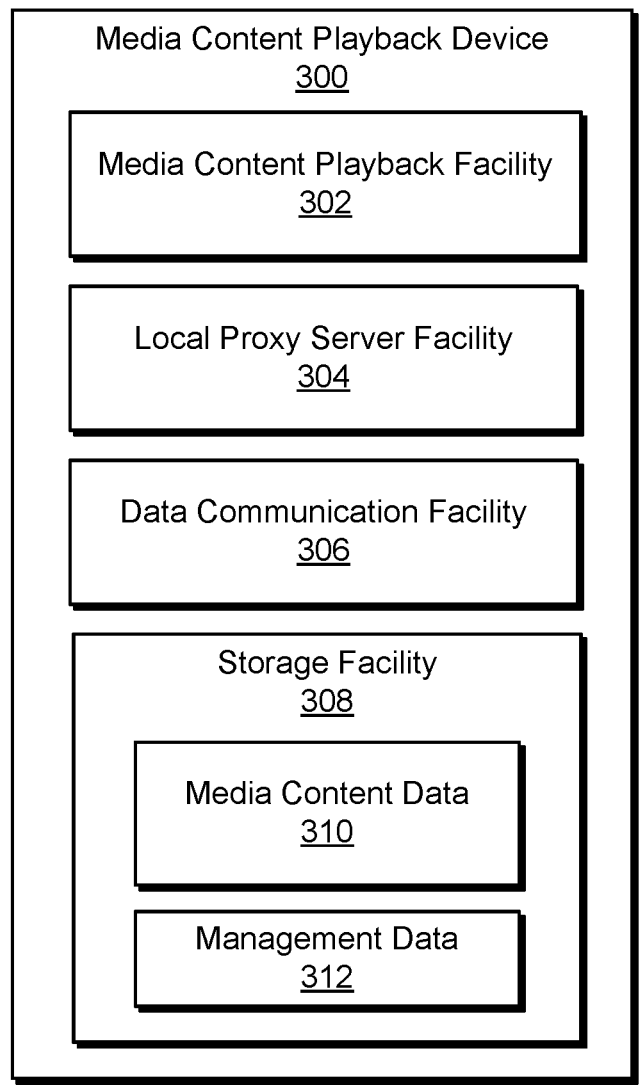
FIG. 3 illustrates an exemplary media content playback device configured to facilitate cloud-based media content transcoding according to principles described herein.

FIG. 3 illustrates an exemplary media content playback device 300 configured to facilitate cloud-based media content transcoding according to methods and systems described herein. Media content playback device 300 may be similar or the same as media content playback devices 104 and may similarly be located remotely from a user premises (e.g., user premises 112) or located at the user premises with a communicative connection to a local media content server (e.g., local media content server 102) via a local area network (e.g., local area network 110) as described above in relation to FIG. 1. As shown, media content playback device 300 may include, without limitation, a media content playback facility 302, a local proxy server facility 304, a data communication facility 306, and a storage facility 308 selectively and communicatively coupled to one another. It will be recognized that although facilities 302-308 are shown to be separate facilities in FIG. 3, any of facilities 302-308 may be combined into fewer facilities, such as into a single facility, or divided into more facilities as may serve a particular implementation.

Storage facility 308 may maintain media content data 310 and management data 312 generated and/or used by media content playback facility 302, local proxy server facility 304, and/or data communication facility 306. For example, media content data 310 may include recordings of media content programs received by media content playback device 300 (e.g., from a local media content server such as local media content server 102 in FIG. 1 or a cloud-based transcoding system such as cloud-based transcoding system 106 in FIG. 1). Media content programs may be stored within media content data 310 as entire media content programs or as pluralities of individual program segments. Additionally, media content data 310 may store transcoded versions of media content programs or program segments, non-transcoded versions of media content programs or program segments, and/or program segment playlists including pointers to program segments of media content programs. Management data 312 may include any data related to operations performed by media content playback device 300. For example, management data 312 may include software instructions and data related to receiving program segment playlists, processing pointers within program segment playlists, requesting transcoded versions of program segments from a cloud-based transcoding system based on the pointers, downloading the transcoded versions of the program segments from the cloud-based transcoding system, playing back media content programs (e.g., by consecutively playing back the plurality of program segments according to the program segment playlist), and/or related to any other operation performed by media content playback facility 302, local proxy server facility 304, or data communication facility 306 that may serve a particular implementation.

Media content playback facility 302 may perform one or more processing operations on media content requested by a user of media content playback device 300 such as encoding, decoding, transcoding, rendering, and/or otherwise processing media content data for playback by media content playback device 300. As such, media content playback facility 202 may include video processing resources (e.g., display screens, video codecs, etc.), audio processing resources (e.g., audio amplifiers, audio speakers, audio codecs, etc.), and other processing resources that may facilitate playback of a media content program on media content playback device 300.

In some examples, media content playback device 300 may send a request to a local media content server (e.g., local media content server 102 of FIG. 1 or local media content server 200 of FIG. 2) to download a media content program. In response, media content playback device 300 may receive from the local media content server (e.g., via data communication facility 306) a program segment playlist including pointers to a plurality of program segments of the requested media content program. Based on the pointers within the program segment playlist, media content playback facility 302 may be configured to access transcoded versions of the plurality of program segments via local proxy server facility 304, as will be described in more detail below. Additionally, media content playback facility 302 may be configured to play back the media content program for the user by continuously playing back each of the transcoded versions of the plurality of program segments of the media content program in a sequence based on the program segment playlist.

Local proxy server facility 304 may operate in conjunction with media content playback facility 302 to facilitate accessing transcoded versions of program segments of a requested media content program according to a program segment playlist. Specifically, as will be described in more detail below, local proxy server facility 304 may be configured to request the transcoded versions of the plurality of program segments of the media content program from the cloud-based transcoding system based on the pointers within the program segment playlist.

In some examples, local proxy server facility 304 may, as part of requesting the transcoded versions of the program segments of the media content program, receive from media content playback facility 302 a first pointer to a first program segment from the pointers to the plurality of program segments of the media content program included in the program segment playlist, determine that a first transcoded version of the first program segment referenced by the first pointer is not stored on the media content playback device, and request from the cloud-based transcoding system the first transcoded version of the first program segment referenced by the first pointer. Moreover, as an additional aspect of requesting the transcoded versions of the program segments of the media content program from the cloud-based transcoding system, local proxy server facility 304 may receive from media content playback facility 302 a second pointer to a second program segment from the pointers to the plurality of program segments of the media content program included in the program segment playlist, determine that a second transcoded version of the second program segment referenced by the second pointer is not stored on the media content playback device, and request from the cloud-based transcoding system the second transcoded version of the second program segment referenced by the second pointer.

In certain examples, the cloud-based transcoding system may generate the first and second transcoded versions of the program segments referenced by the first and second pointers by concurrently transcoding the first and second program segments referenced by the first and second pointers. For example, by default or based on a specific request from local proxy server facility 304 to perform the transcoding concurrently, the cloud-based transcoding system may transcode the first and second transcoded versions of the program segments in parallel (e.g., at the same time using two independent transcoding resources) to allow for a high quality transcoding of both program segments in just the time that it takes to transcode a single program segment.

One advantage of methods and systems described herein is that local proxy server facility 304 may be retroactively added to a conventional media content playback device (e.g. by a software update) while certain parts of the media content playback device (e.g., media content playback facility 302) may operate without being specifically altered. In particular, media content playback facility 302 may be a conventional media content playback facility configured to access media content based on pointers and to play back media content based on playlists. As such, media content playback facility 302 may access media content referenced by a pointer and may be indifferent as to the actual source of the media content. Thus, if the pointers within the program segment playlist point to a cloud-based transcoding system and local proxy server facility 304 accesses the transcoded versions of the program segments from the cloud-based transcoding system, media content playback facility 302 may be indifferent (i.e. may not need to be informed) that the media content program is transcoded by a cloud-based transcoding service that concurrently transcodes a plurality of program segments rather than by the local media content server from which the media content program was requested. Rather, media content playback facility 302 may request media content and play back the media content according to a playlist using conventional methods while local proxy server facility 304, the local media content server, and the cloud-based transcoding system implement various novel aspects of particular embodiments of cloud-based media content transcoding.

Data communication facility 306 may perform any suitable communication operations for proper functionality of media content playback device 300. For example, as will be described in more detail below, data communication facility 304 may facilitate receiving requests from a user (e.g., one of users 108 of FIG. 1) and/or sending requests to a local media content server (e.g., local media content server 102 of FIG. 1) to access, download, and/or play back a particular media content program. Data communication facility 306 may also facilitate requesting and/or receiving transcoded versions of program segments of a media content program from a cloud-based transcoding system (e.g., cloud-based transcoding system 106 of FIG. 1). The operations performed by media content playback facility 302, local proxy server facility 304, and data communication facility 306 within media content playback device 300 will be described in more detail below.

Figure 4:
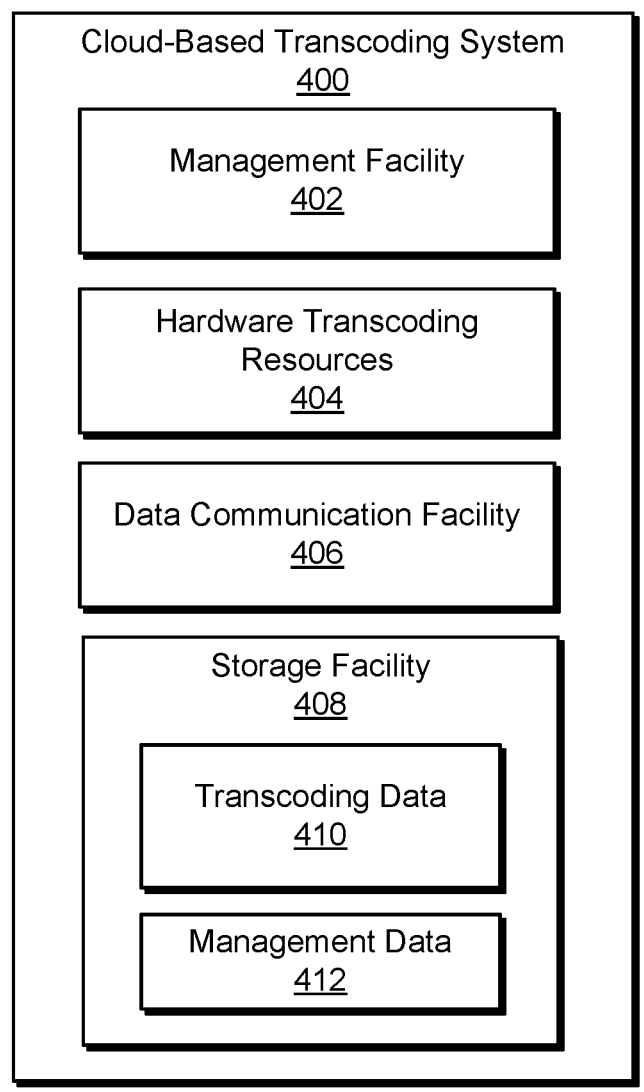
FIG. 4 illustrates an exemplary cloud-based transcoding system configured to facilitate cloud-based media content transcoding according to principles described herein.

FIG. 4 illustrates an exemplary cloud-based transcoding system 400 configured to facilitate cloud-based media content transcoding according to methods and systems described herein. Cloud-based transcoding system 400 may be similar or the same as cloud-based transcoding system 106 and may similarly be located remotely from a user premises (e.g., user premises 112) with connections to other devices and systems as described above in relation to FIG. 1. As shown, cloud-based transcoding system 400 may include, without limitation, a management facility 402, a plurality of hardware transcoding resources 404, a data communication facility 406, and a storage facility 408 selectively and communicatively coupled to one another. It will be recognized that although facilities 402-408 are shown to be separate facilities in FIG. 4, any of facilities 402-408 may be combined into fewer facilities, such as into a single facility, or divided into more facilities as may serve a particular implementation.

Storage facility 408 may maintain transcoding data 410 and management data 412 generated and/or used by management facility 402, hardware transcoding resources 404, and/or data communication facility 406. For example, transcoding data 410 may include any suitable data used by hardware transcoding resources 404 to transcode media content, including to perform concurrent transcoding of multiple program segments of a media content program at once. Management data 412 may include any suitable data used by cloud-based transcoding system 400 to perform operations facilitating the transcoding of media content programs and/or pluralities of program segments of media content programs. For example, management data 412 may include software instructions for requesting, receiving, and/ or accessing media content programs or program segments (e.g., non-transcoded versions of media content programs or program segments), software instructions for generating transcoded versions of the media content programs or program segments, software instructions for transmitting the transcoded versions of the media content programs or program segments to a media content playback device that requested the transcoded versions of the media content programs or program segments, and/or other information for transcoding and/or otherwise processing and preparing media content programs or program segments.

Management facility 402 may perform any operations for transcoding and/or related to or supportive of transcoding that may serve a particular implementation. For example, management facility 402 may receive a request for transcoded versions of a plurality of program segments of a media content program from a media content playback device (e.g., by one of media content playback devices 104 of FIG. 1 or by media content playback device 300 of FIG. 3), where each program segment within the plurality of program segments may comprise a different portion of the media content program. The request may include an identifier associated with a local media content server (e.g., local media content server 102 of FIG. 1 or local media content server 200 of FIG. 2) that has recorded the media content program and that is located at a user premises of a user of the local media content server (e.g., user premises 112 of FIG. 1). As will be described in more detail below, the request may be based on a program segment playlist including pointers to the plurality of program segments of the media content program, the program segment playlist transmitted from the local media content server to the media content playback device in response to a request to download the media content program to the media content playback device.

Management facility 402 may access the plurality of program segments referenced by the pointers in the program segment playlist from the local media content server. Specifically, management facility 402 may establish a connection (e.g., a socket connection) with the local media content server that has recorded the media content program and download the plurality of program segments from the local media content server. In some examples, management facility 402 may perform the accessing of the plurality of program segments in response to receiving a request for the transcoded versions of the plurality of program segments of the media content program from the media content playback device (i.e., on demand). In other examples, management facility 402 may perform the accessing of the plurality of program segments prior to receiving the request for transcoded versions of the plurality of program segments of the media content program from the media content playback device. For example, management facility 402 may be programmed to access program segments that have not yet been transcoded at times when cloud-based transcoding system 400 is not operating at full capacity to transcode and/or otherwise process media content associated with pending transcoding requests. By continuing to transcode media content even when all pending requests have been fulfilled, cloud-based transcoding system 400 may be prepared to quickly and efficiently transmit transcoded versions of requested media content programs or program segments if requests for the transcoded versions of the requested media content programs or program segments are received in the future.

Management facility 402 may generate the transcoded versions of the plurality of program segments of the media content program. As explained above in relation to accessing the program segments from the local media content server, management facility 402 may generate the transcoded versions of the program segments on demand or ahead of time. Additionally, as will be described in more detail below in relation to hardware transcoding resources 404, management facility 402 may facilitate the generation of transcoded versions of at least two program segments concurrently (i.e. simultaneously or in parallel). In response to the request for transcoded versions of the plurality of program segments and after the transcoded versions have been generated, management facility 402 may transmit the transcoded versions of the plurality of program segments to the media content playback device that requested the transcoded versions of the program segments.

Hardware transcoding resources 404 may include any shared or dedicated resources for transcoding media content. For example, hardware transcoding resources 404 may include a plurality of transcoders (e.g., hardware processors specifically configured to transcode media content) and/or general purpose processors running transcoding software. Because cloud-based transcoding system 400 may provide cloud-based transcoding services to a plurality of local media content servers associated with pluralities of media content playback devices, hardware transcoding resources 404 may include and efficiently utilize a large number of hardware transcoding resources.

For example, while a single local media content server may not generate enough transcoding requests to keep a large number of hardware transcoding resources in efficient operation (e.g., operating at or near full capacity), cloud-based transcoding system 400 may service enough local media content servers and media content playback devices to keep a large number of hardware transcoding resources operating at or near full capacity for a larger proportion of the time. As such, transcoding system 400 may efficiently assign a large plurality of hardware transcoding resources to requests from a single media content playback device to generate the transcoded versions of several or all of the requested program segments of a media content program concurrently. For example, for a media content program that is sixty minutes in length and that has been divided into sixty one-minute long program segments, transcoding system 400 may have at least sixty hardware transcoding resources 404 available to assign to the media content program for the one minute it will take for the sixty hardware transcoding resources 404 to transcode the sixty program segments concurrently. Conversely it may be inefficient (e.g., expensive, impractical, etc.) for an individual local media content server to include sixty separate hardware transcoding resources to perform the same feat. In certain examples, hardware transcoding resources 404 are configured to generate transcoded versions of pluralities of program segments from at least two local media content servers concurrently.

Data communication facility 406 may perform any suitable communication operations for proper functionality of cloud-based transcoding system 400. For example, as will be described in more detail below, data communication facility 406 may facilitate receiving requests from a media content playback device (e.g., one of media content playback devices 104 of FIG. 1) to access and/or transcode program segments of a media content program to generate transcoded versions of the program segments. As such, data communication facility 406 may also facilitate the establishment of a connection (e.g., a socket connection) with a local media content server and the downloading of the plurality of program segments of the media content program from the local media content server to cloud-based transcoding system 400. Data communication facility 406 may also facilitate transmitting the transcoded versions of the program segments and/or other data to media content playback devices (e.g., media content playback devices 104) after the transcoded versions have been generated. The operations performed by management facility 402, hardware transcoding resources 404, and data communication facility 406 within cloud-based transcoding system 400 will be described in more detail below.

As described above in relation to FIG. 1, a local media content server (e.g., local media content server 102 or local media content server 200 of FIG. 2), a media content playback device (e.g., one of media content playback devices 104 or media content playback device 300 of FIG. 3), and a cloud-based transcoding system (e.g., cloud-based transcoding system 106 or cloud-based transcoding system 400 of FIG. 4) may operate in conjunction to perform cloud-based media content transcoding of a media content program received from a media content provider system (e.g., media content provider system 114). To illustrate cloud-based media content transcoding in more detail, FIG. 5 shows an exemplary data flow 500 of cloud-based media content transcoding being performed by a media content provider system 502, a local media content server 504, a media content playback device 506, and a cloud-based transcoding system 508.

Figure 5:
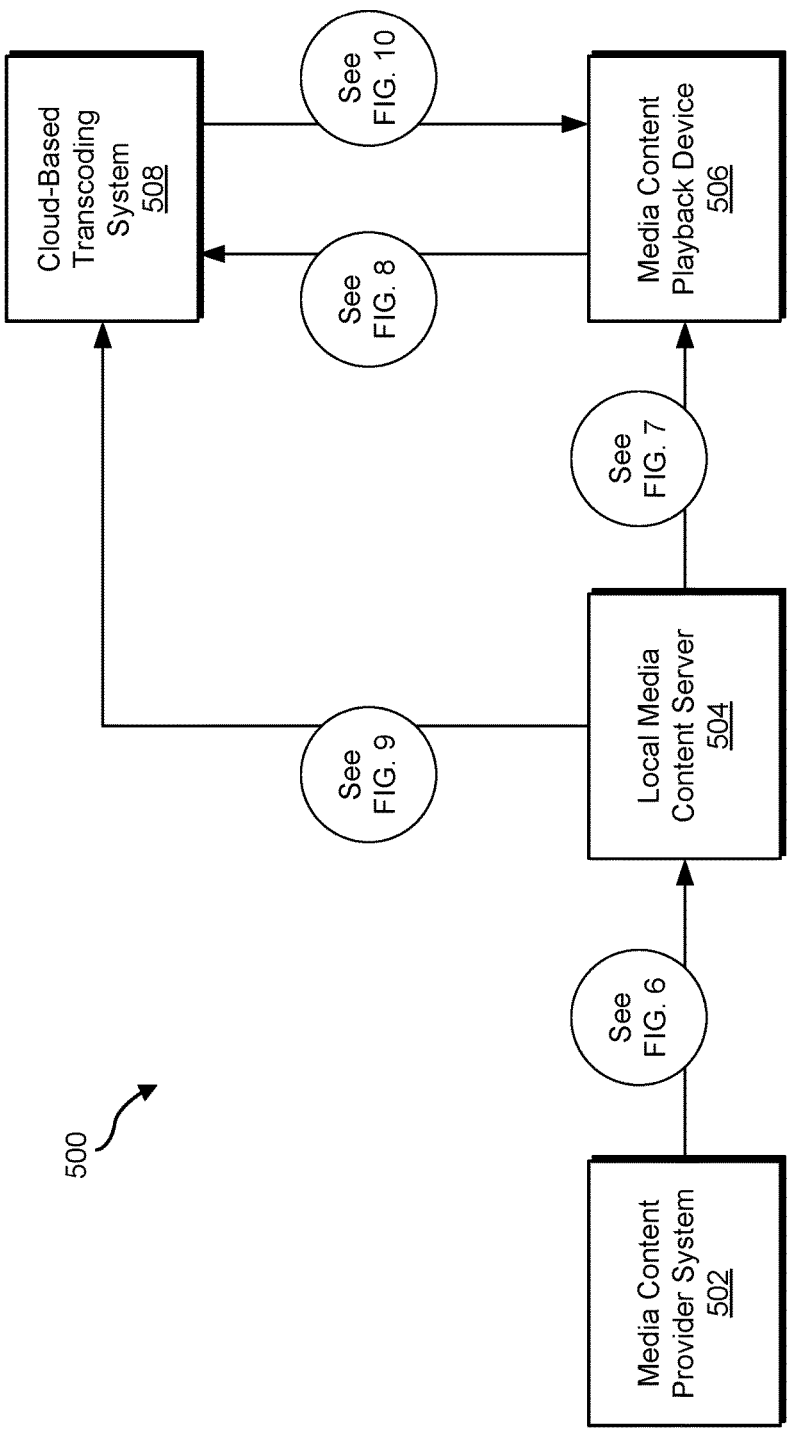
FIG. 5 illustrates an exemplary data flow of cloud-based media content transcoding according to principles described herein.

In FIG. 5, various components illustrated to be sending and/or receiving data as part of data flow 500 may be similar or the same as corresponding components described above. Specifically, media content provider system 502 may be similar or the same as media content provider system 114, described above in relation to FIG. 1. Local media content server 504 may be similar or the same as local media content server 102, described above in relation to FIG. 1, or local media content server 200, described above in relation to FIG. 2. Media content playback device 506 may be similar or the same as one of media content playback devices 104, described above in relation to FIG. 1, or media content playback device 300, described above in relation to FIG. 3. Finally, cloud-based transcoding system 508 may be similar or the same as cloud-based transcoding system 106, described above in relation to FIG. 1, or cloud-based transcoding system 400, described above in relation to FIG. 4.

Figure 6:
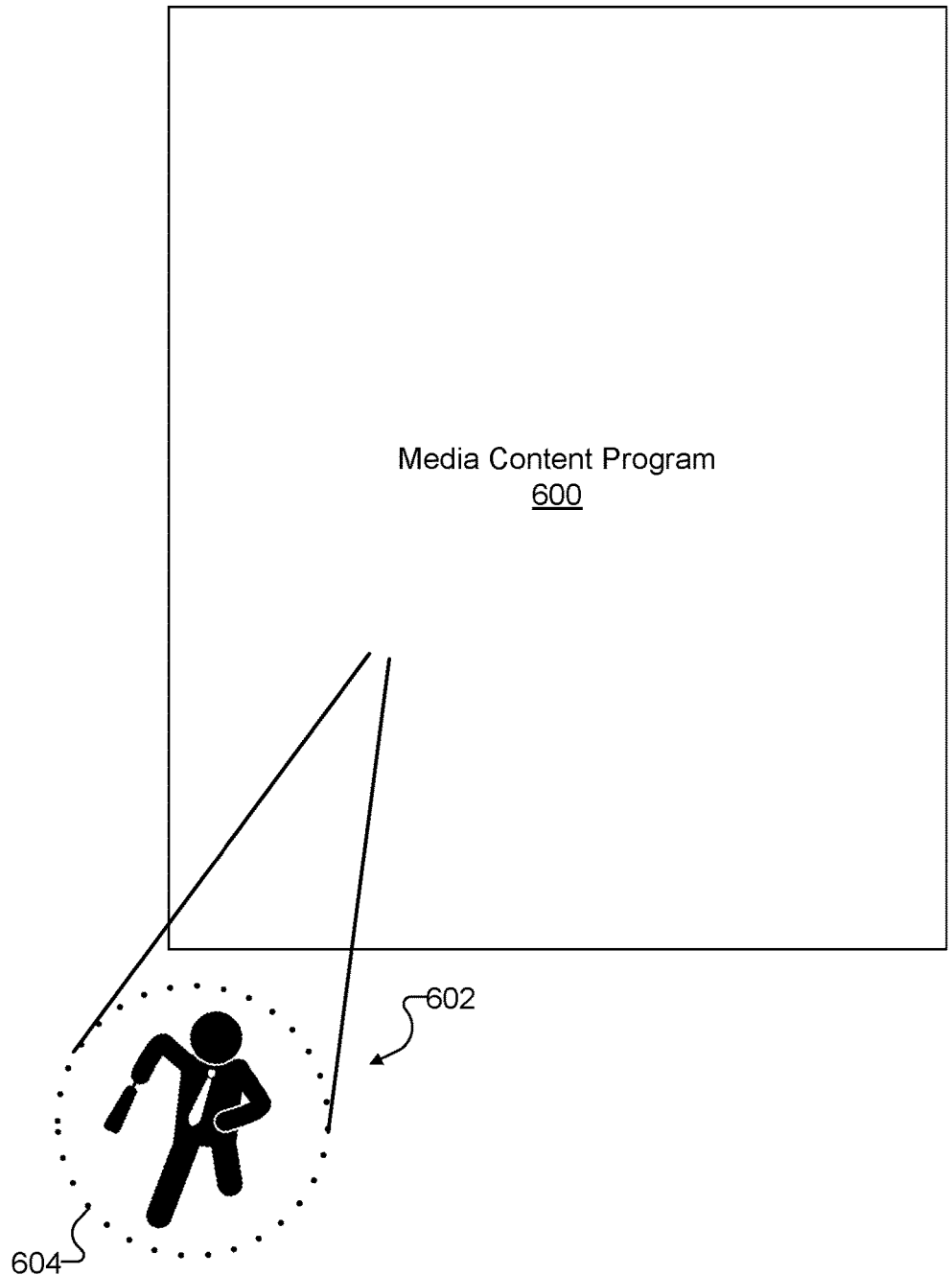
FIG. 6 illustrates an exemplary media content program provided by a media content provider system to a local media content server according to principles described herein.
Figure 7:
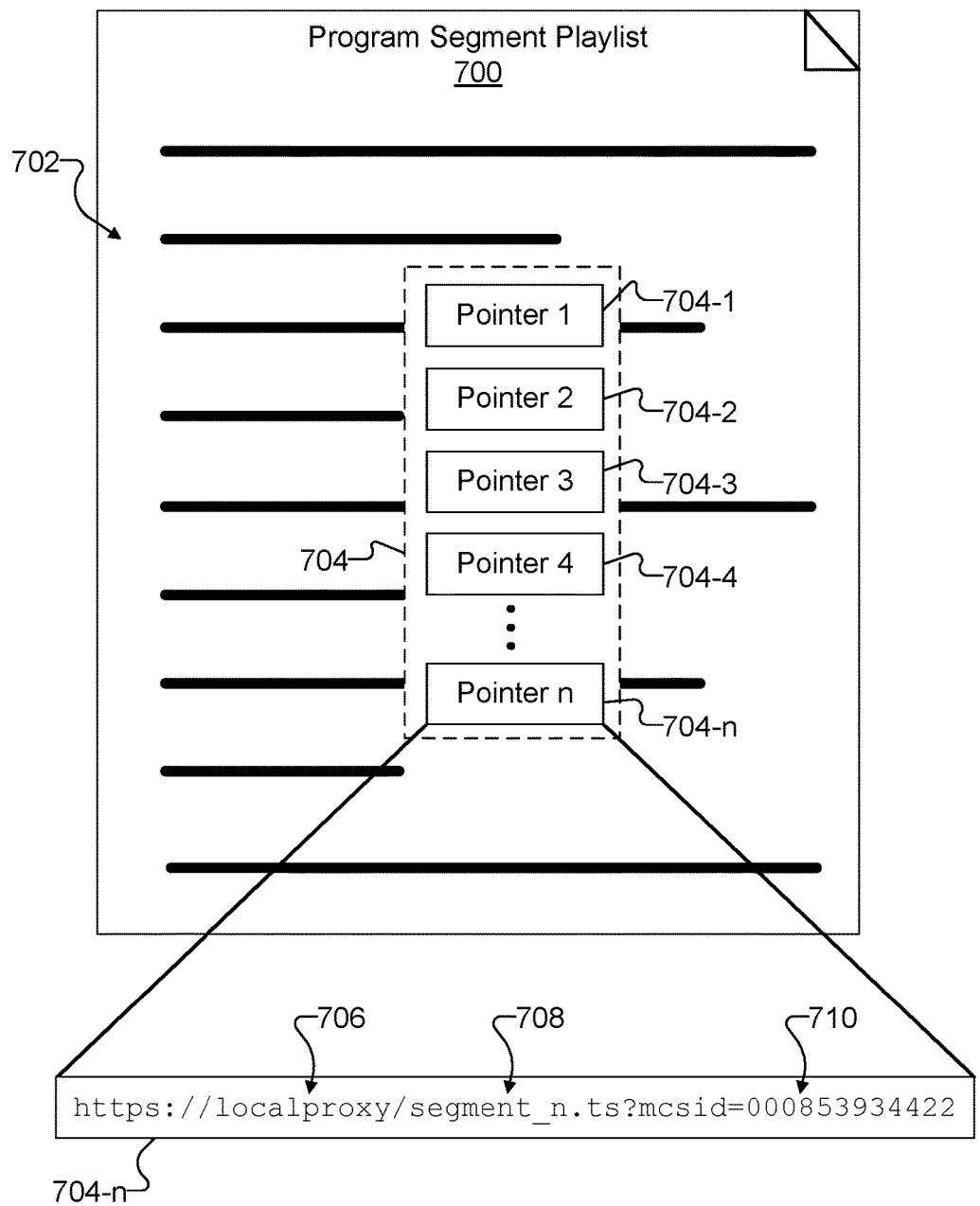
FIG. 7 illustrates an exemplary program segment playlist provided by a local media content server to a media content playback device according to principles described herein.
Figure 8:
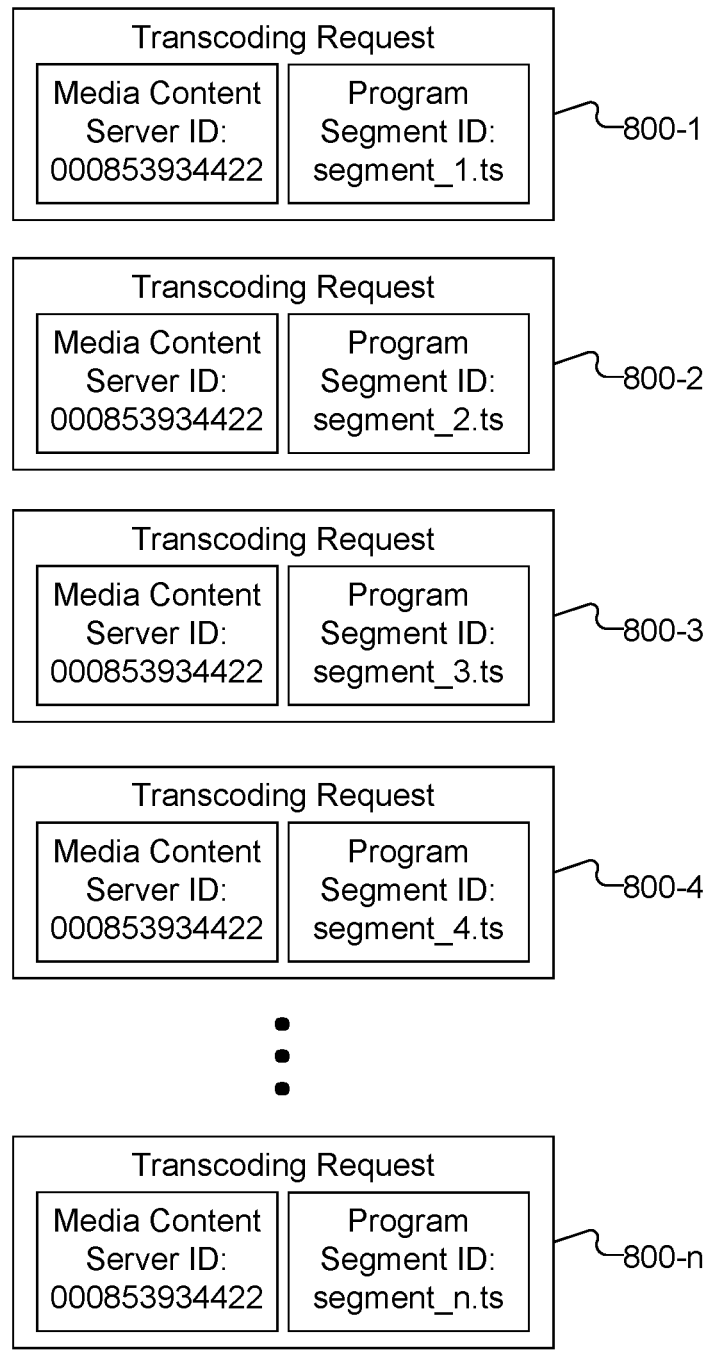
FIG. 8 illustrates exemplary transcoding requests provided by a media content playback device to a cloud-based transcoding system according to principles described herein.
Figure 9:
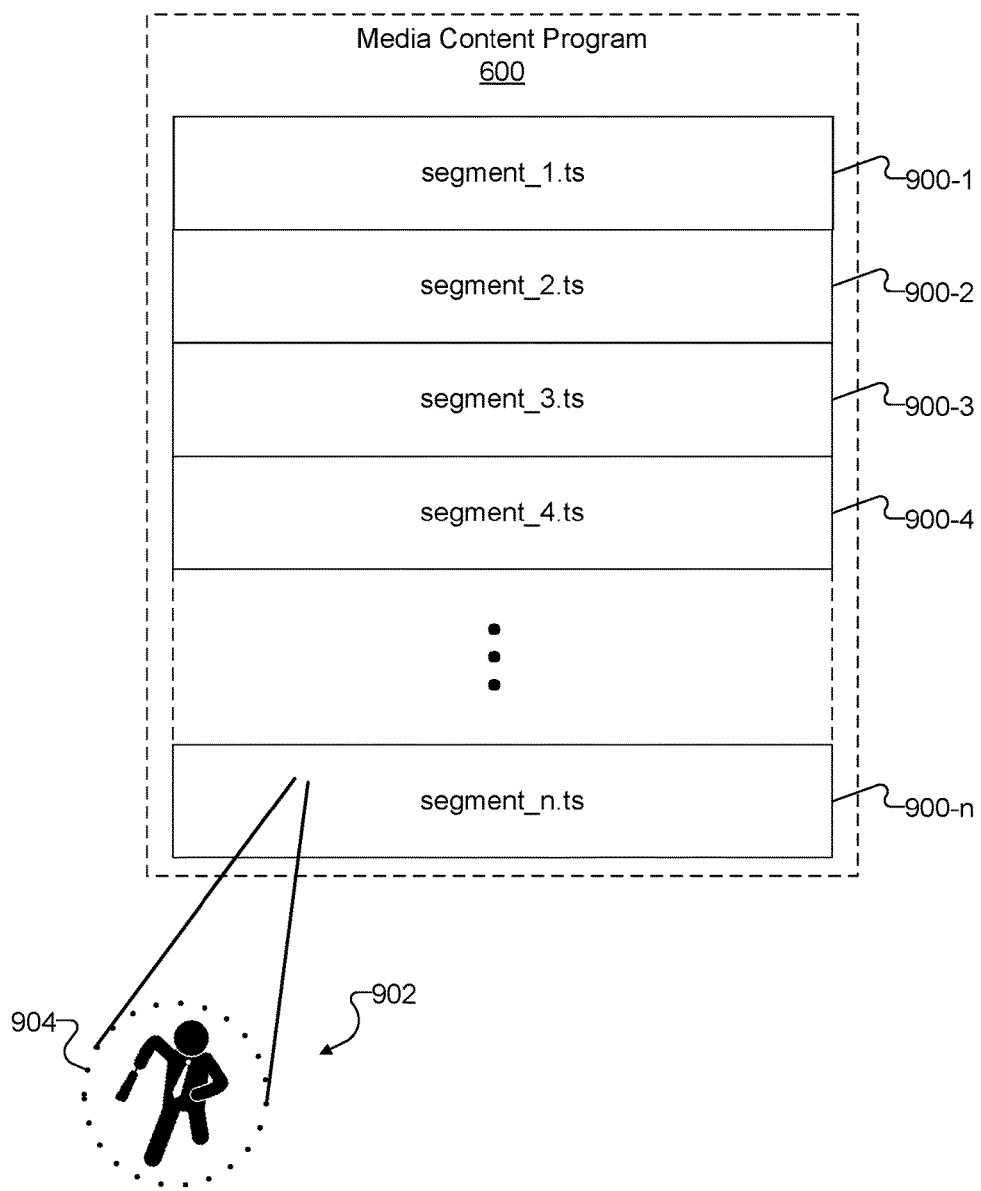
FIG. 9 illustrates an exemplary plurality of program segments of a media content program provided by a local media content server to cloud-based transcoding system according to principles described herein.
Figure 10:
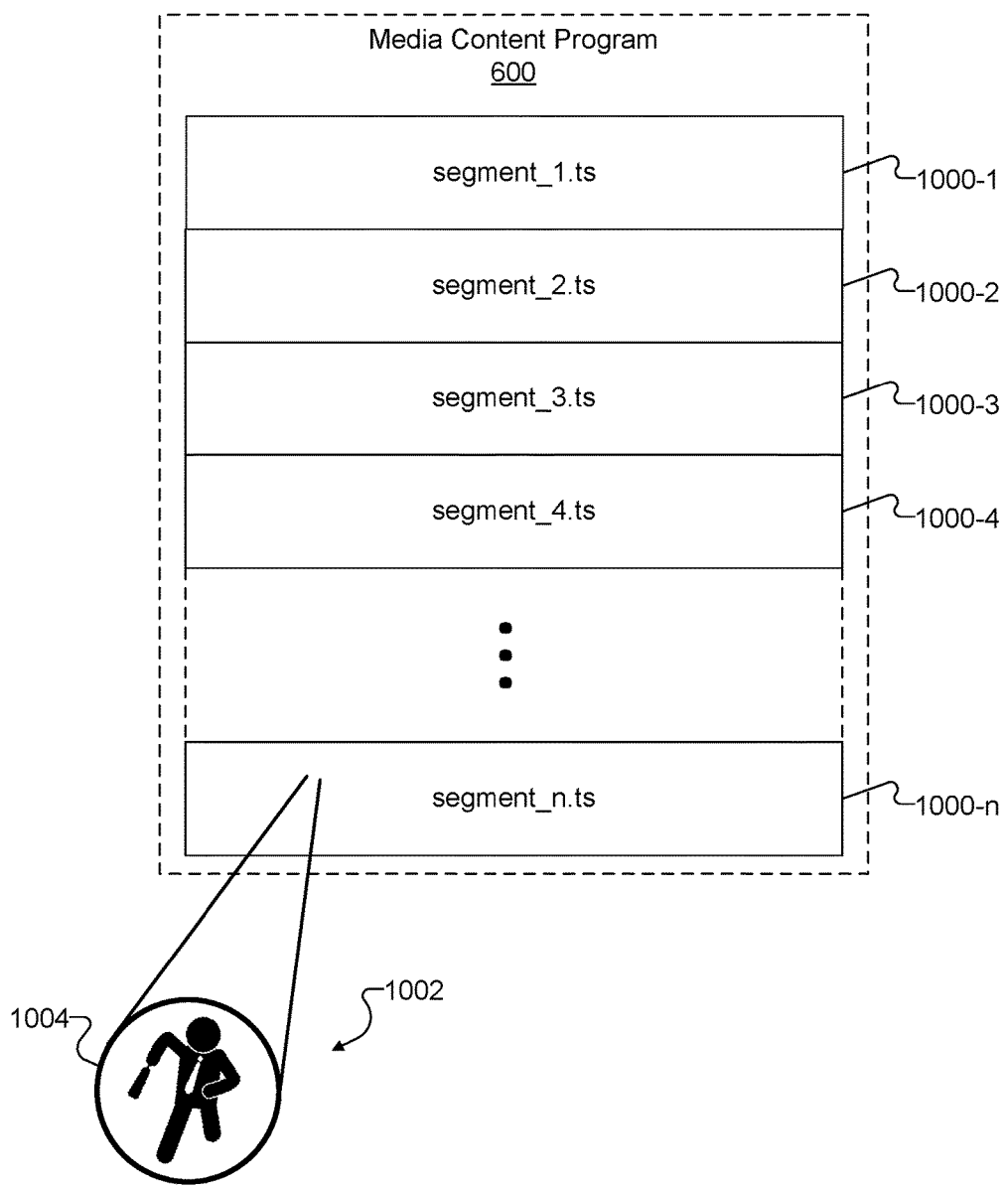
FIG. 10 illustrates transcoded versions of an exemplary plurality of program segments of a media content program provided by a cloud-based transcoding system to a media content playback device according to principles described herein.

FIG. 5 depicts arrows interconnecting media content provider system 502, local media content server 504, media content playback device 506, and cloud-based transcoding system 508. Each arrow may represent data being sent from one system or device to another system or device in the direction of the arrow. Additionally, each arrow in FIG. 5 indicates a figure in the drawings that illustrates the data being transferred in more detail. For example, as indicated in FIG. 5, FIG. 6 illustrates data transferred from media content provider system 502 to local media content server 504, FIG. 7 illustrates data transferred from local media content server 504 to media content playback device 506, FIG. 8 illustrates data transferred from media content playback device 506 to cloud-based transcoding system 508, FIG. 9 illustrates data transferred from local media content server 504 to cloud-based transcoding system 508, and FIG. 10 illustrates data transferred from cloud-based transcoding system 508 to media content playback device 506. The data represented by each of the arrows in FIG. 5 will now be described in relation to the respective figures indicated.

FIG. 6 illustrates an exemplary media content program 600 provided by media content provider system 502 to local media content server 504. Media content program 600 may include any suitable media content data (e.g., video data, audio data, metadata, trick play data, etc.) representing or otherwise corresponding to any media content program that may serve a particular implementation. For example, as suggested by video graphic 602, media content program 600 may include video data representative of a movie, television show, advertisement, or other video-based media content program. In other examples, media content program 600 may include data representative of an audio-only media content program (e.g., a radio program, a podcast, etc.) or any other type of media content program.

In certain examples, media content program 600 may be transferred from media content provider system 502 in a format that is non-ideal or unsuitable for playback by a device such as media content playback device 506. For example, while one or more playback devices associated with local media content server 504 (e.g., a large television and high fidelity audio system included within a home theater system) may be well adapted to play back media content program 600 in the format sent by media content provider system 502, it may be desirable for media content program 600 to be transcoded to use a different format and/or a different (e.g., slower) data rate in order for media content playback device 506 to play back media content program 600. As such, video graphic 602 is outlined with a dotted line 604 to indicate that the media content within media content program 600 has not yet been transcoded for use by media content playback device 506.

As described above, as or after media content program 600 is received from media content provider system 502, local media content server 504 may record media content program 600 and divide media content program 600 into a plurality of program segments (not shown in FIG. 6). For example, each program segment may include a different portion of media content program 600. Local media content server 504 may also generate a program segment playlist that includes pointers to the plurality of program segments. Local media content server 504 may provide the program segment playlist to media content playback device 506 in response to a request to download media content program 600 to media content playback device 506.

FIG. 7 illustrates an exemplary program segment playlist 700 provided by local media content server 504 to media content playback device 506. For example, as described above, local media content server 504 may generate program segment playlist 700 to include any suitable data 702 (e.g., textual data, code, instructions, etc.) that may include pointers to the plurality of program segments into which media content program 600 is divided. For example, as shown, data 702 may include text indicative of pointers 704 (e.g., pointers 704-1 through 704-n), which may each reference a particular program segment of the plurality of program segments of media content program 600.

To illustrate, a particular one of pointers 704 (i.e. pointer 704-n) is broken out in FIG. 7 and shown with exemplary details that may be included in each of pointers 704. Specifically, as shown, pointer 704-n may include a URL having a hostname 706 and a file identifier 708. As shown, hostname 706 may point to "localproxy", which may correspond to a local proxy server facility within media content playback device 506 similar to local proxy server facility 304 of media content playback device 300, described above in relation to FIG. 3. File identifier 708 may correspond to a respective program segment included within the plurality of program segments into which media content program 600 is divided. As such, file identifier 708 may provide any suitable information that may serve to identify the respective program segment in a particular implementation. For example, as shown, file identifier 708 may uniquely identify the respective program segment included in the plurality of program segments to which file identifier 708 corresponds by using a unique segment name (e.g., "segment_n" where "n" is a number uniquely identifying the respective program segment) and indicating the local media content server where the respective program segment is recorded (e.g., local media content server 504). For example, a local media content server identifier 710 may include a number (i.e., "000853934422") that uniquely identifies local media content server 504 from other local media content servers to which cloud-based transcoding system 508 may provide cloud-based transcoding services. In other examples, file identifier 708 may include other information used to identify the respective program segment such as a media content program identifier, one or more timestamps indicative of start and/or end times of the respective program segment within the media content program, etc.

As described above, the local proxy server facility indicated by hostname 706 may be configured to determine whether a transcoded version of a program segment corresponding to file identifier 708 is available within media content playback device 506 (e.g., from a previous instance when media content playback device 506 was used to view media content program 600). If no transcoded version of the program segment corresponding to file identifier 708 is available within media content playback device 506 (e.g., within a storage facility of media content playback device 506 similar to storage facility 308 of media content playback device 300), the local proxy server facility may request, based on hostname 706 and file identifier 708, a transcoded version of the program segment corresponding to file identifier 708 from cloud-based transcoding system 508.

To illustrate, FIG. 8 shows exemplary transcoding requests 800 (e.g., transcoding requests 800-1 through 800-*n*) provided by media content playback device 506 to cloud-based transcoding system 508. Transcoding requests 800 may each correspond to a respective program segment of media content program 600 that is represented by a pointer within program segment playlist 700. For example, as shown in FIG. 8, transcoding request 800-1 indicates a request for a transcoded version of a program segment with a program segment identifier (e.g., a filename) "segment_1.ts" recorded on a local media content server identified by number 000853934422 (i.e. local media content server 504). Similarly, transcoding request 800-2 indicates a request for a transcoded version of a program segment with a program segment identifier "segment_2.ts" recorded on the same local media content server, and so on for transcoding requests 800-3 through 800-*n*. Transcoding requests 800 may include any suitable information to request a transcoded version of a media content program or program segment thereof and to identify the media content program or respective program segment requested. In some examples, transcoding requests 800 may include less information than shown in FIG. 8 or additional information to supplement the information shown in FIG. 8. Additionally, in certain examples, transcoding requests 800 may be combined into fewer requests or into a single request that asks for each of the respective program segments of media content program 600 within one transcoding request 800.

As described above, prior to or in response to receiving one or more requests for transcoded versions of a plurality of program segments of a media content program (e.g., transcoding requests 800 for program segments of media content program 600), a cloud-based transcoding system (e.g., cloud-based transcoding system 508) may access the plurality of program segments from a local media content server (e.g., local media content server 504). To illustrate, FIG. 9 shows an exemplary plurality of program segments 900 (e.g., program segments 900-1 through 900-*n*) of media content program 600 provided by local media content server 504 to cloud-based transcoding system 508.

As indicated in FIG. 9 by a video graphic 902 corresponding to program segment 900-*n*, program segment 900-*n* and each of the other program segments 900 may include media content data (e.g., video data, audio data, metadata, trick play data, etc.) comprising a program segment of media content program 600. Similarly, a dotted line 904 outlining video graphic 902 indicates that the data within program segments 900 has not yet been transcoded for playback by media content playback device 506.

As mentioned above, cloud-based transcoding system 508 may download program segments 900 in any way and at any time as may serve a particular implementation. For example, cloud-based transcoding system 508 may establish a connection (e.g., a socket connection) with local media content server 504 and download program segments 900 from local media content server 504 in response to transcoding requests 800. In other examples, cloud-based transcoding system 508 may establish the connection and download program segments 900 prior to receiving any specific transcoding request, such as at a time when cloud-based transcoding system 508 is not operating at full capacity to fulfill pending transcoding requests that cloud-based transcoding system 508 has received.

After accessing program segments 900 from local media content server 504, cloud-based transcoding system 508 may generate transcoded versions of program segments 900 in any of the ways and/or using any of the resources described above. For example, cloud-based transcoding system 508 may generate transcoded versions of program segments 900 by concurrently (i.e. simultaneously or in parallel) transcoding each of program segments 900 using n number of hardware transcoding resources (e.g., corresponding to hardware transcoding resources 404 of cloud-based transcoding system 400, described above in relation to FIG. 4). After generating the transcoded versions of program segments 900 and in response to receiving transcoding requests 800, cloud-based transcoding system 508 may transmit the transcoded versions of program segments 900 to media content playback device 506.

To illustrate, FIG. 10 shows transcoded versions of an exemplary plurality of program segments 1000 (e.g., program segments 1000-1 through 1000-*n*) of media content program 600 provided by cloud-based transcoding system 508 to media content playback device 504. As indicated in FIG. 10 by a video graphic 1002 corresponding to program segment 1000-*n*, program segment 1000-*n* and each of the other program segments 1000 may include media content data (e.g., video data, audio data, metadata, trick play data, etc.) comprising a program segment of media content program 600. However, in contrast to dotted lines 604 and 904 respectively outlining video graphics 602 of FIG. 6 and 902 of FIG. 9, a solid line 1004 outlining video graphic 1002 indicates that program segments 1000 have been transcoded for playback by media content playback device 506. As such, media content playback device 506 may receive program segments 1000 from cloud-based transcoding system and play back program segments 1000 for a user wishing to view or listen to media content program 600. For example, a media content playback facility within media content playback device 506 (e.g., corresponding to media content playback facility 302, described above in relation to FIG. 3) may play back media content program 600 for the user by continuously playing back each of transcoded program segments 1000 (i.e., consecutively without any pauses) in a sequence based on program segment playlist 700.

Figure 11:
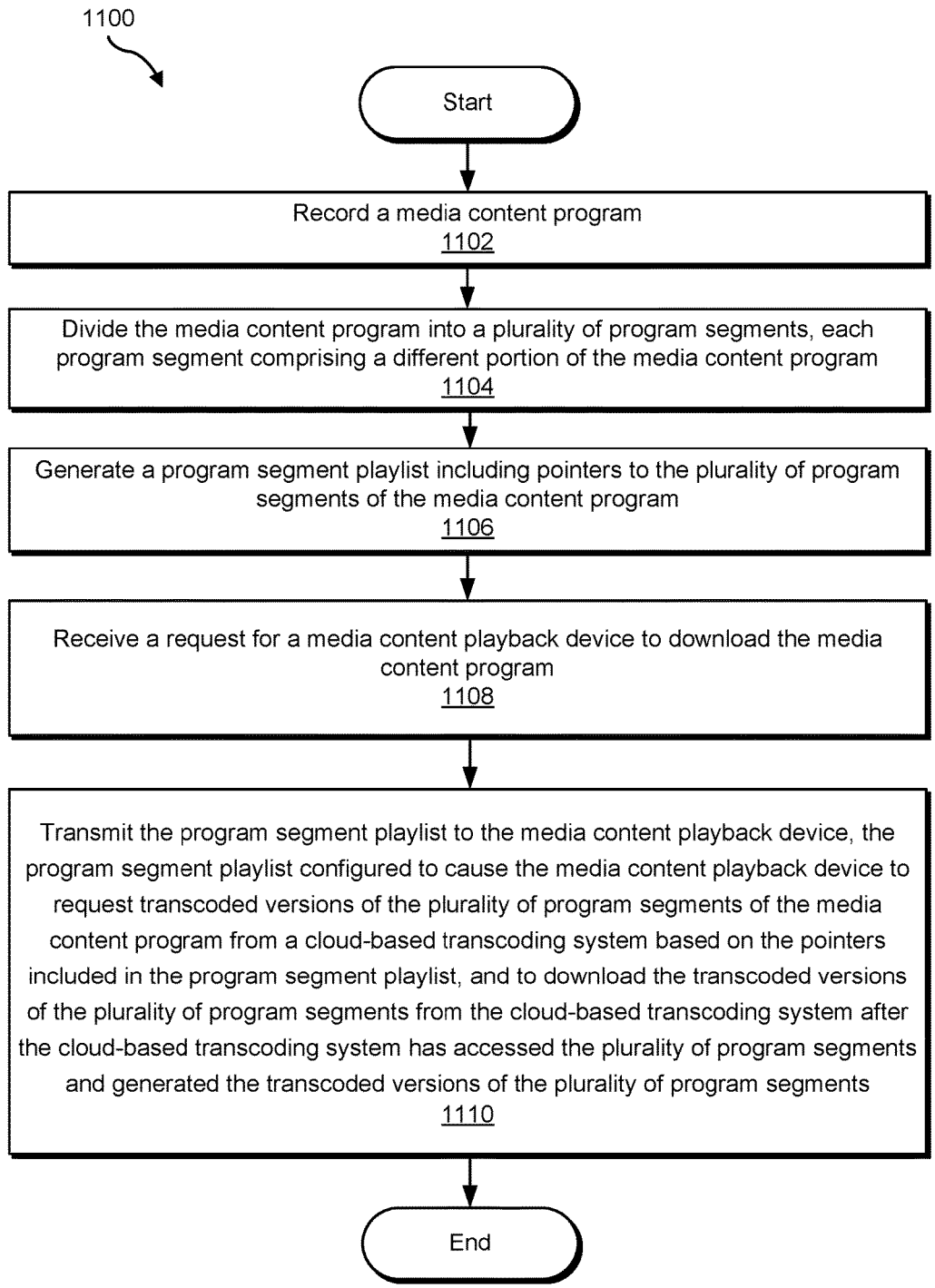
FIGS. 11-12 illustrate exemplary methods for cloud-based media content transcoding according to principles described herein.

FIG. 11 illustrates an exemplary method 1100 of cloud-based media content transcoding. While FIG. 11 illustrates exemplary operations according to one embodiment, other embodiments may omit, add to, reorder, and/or modify any of the operations shown in FIG. 11. One or more of the operations shown in FIG. 11 may be performed by a local media content server (e.g., local media content server 102, 200, or 504) and/or any implementation thereof.

In operation 1102, a local media content server located at a user premises of a user of the local media content server records a media content program. Operation 1102 may be performed in any of the ways described herein.

In operation 1104, the local media content server divides the media content program into a plurality of program segments. In operation 1104, each program segment may comprise a different portion of the media content program. Operation 1104 may be performed in any of the ways described herein.

In operation 1106, the local media content server generates a program segment playlist including pointers to the plurality of program segments of the media content program. Operation 1106 may be performed in any of the ways described herein.

In operation 1108, the local media content server receives a request for a media content playback device associated with the user to download the media content program. Operation 1108 may be performed in any of the ways described herein.

In operation 1110, the local media content server transmits the program segment playlist including the pointers to the plurality of program segments of the media content program to the media content playback device. The local media content server may transmit the program segment playlist in response to the request for the media content playback device associated with the user to download the media content program. The program segment playlist may be configured to cause the media content playback device 1) to request, based on the pointers included in the program segment playlist, transcoded versions of the plurality of program segments of the media content program from a cloud-based transcoding system located remotely from the user premises, and 2) to download the transcoded versions of the plurality of program segments from the cloud-based transcoding system after the cloud-based transcoding system has accessed the plurality of program segments from the local media content server and generated the transcoded versions of the plurality of program segments. Operation 1110 may be performed in any of the ways described herein.

Figure 12:
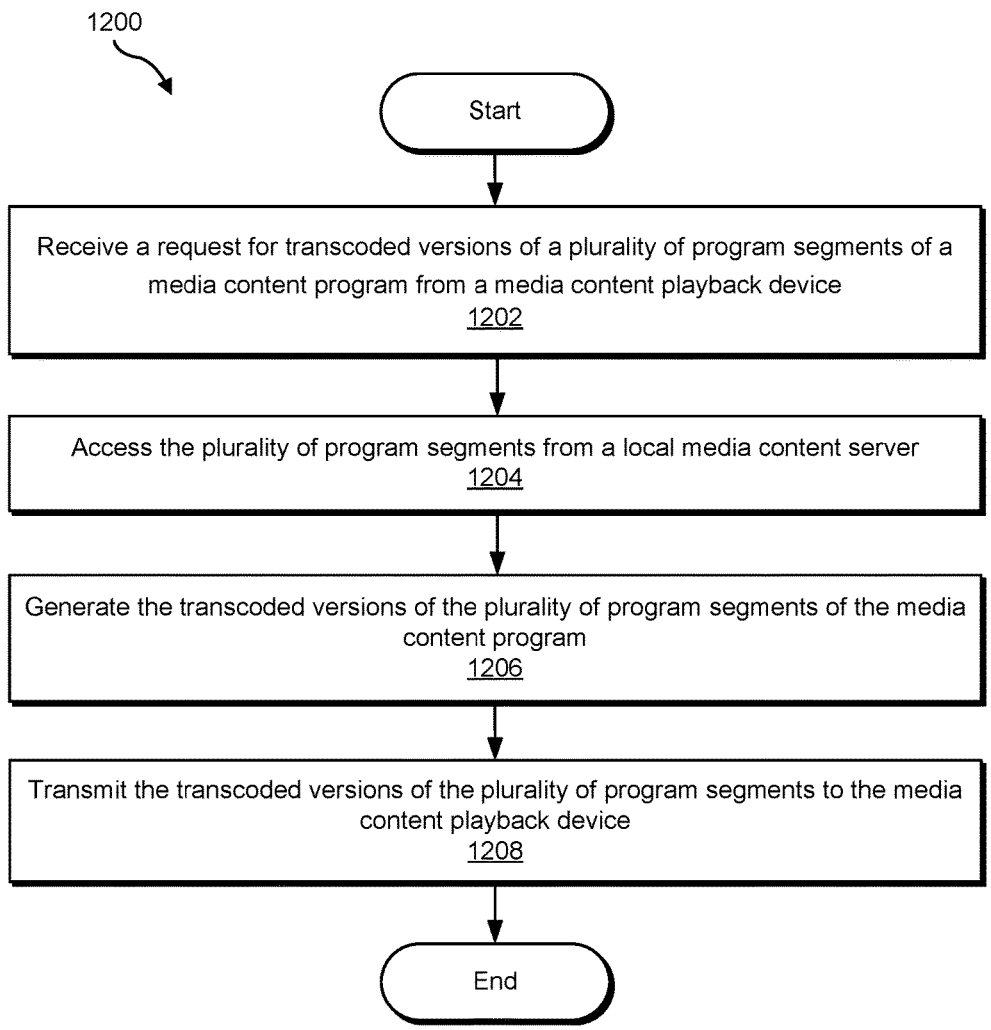

FIG. 12 illustrates another exemplary method 1200 of cloud-based media content transcoding. While FIG. 12 illustrates exemplary operations according to one embodiment, other embodiments may omit, add to, reorder, and/or modify any of the operations shown in FIG. 12. One or more of the operations in FIG. 12 may be performed by cloud-based transcoding system 400 and/or any implementation thereof.

In operation 1202, a cloud-based transcoding system may receive a request for transcoded versions of a plurality of program segments of a media content program from a media content playback device. Each program segment within the plurality of program segments may comprise a different portion of the media content program. In certain examples, the request may include an identifier associated with a local media content server that has recorded the media content program and that may be located at a user premises of a user of the local media content server. In some examples, the request may be based on a program segment playlist including pointers to the plurality of program segments of the media content program. For example, the program segment playlist may have been transmitted from the local media content server to the media content playback device in response to a request to download the media content program to the media content playback device. Operation 1202 may be performed in any of the ways described herein.

In operation 1204, the cloud-based transcoding system may access the plurality of program segments from the local media content server. Operation 1204 may be performed in any of the ways described herein.

In operation 1206, the cloud-based transcoding system may generate the transcoded versions of the plurality of program segments of the media content program. In some examples, the generating of the transcoded versions of at least two program segments of the plurality of program segments may be performed concurrently. Operation 1206 may be performed in any of the ways described herein.

In operation 1208, the cloud-based transcoding system may transmit the transcoded versions of the plurality of program segments to the media content playback device in response to the request for transcoded versions of the plurality of program segments of the media content program. Operation 1208 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 13:
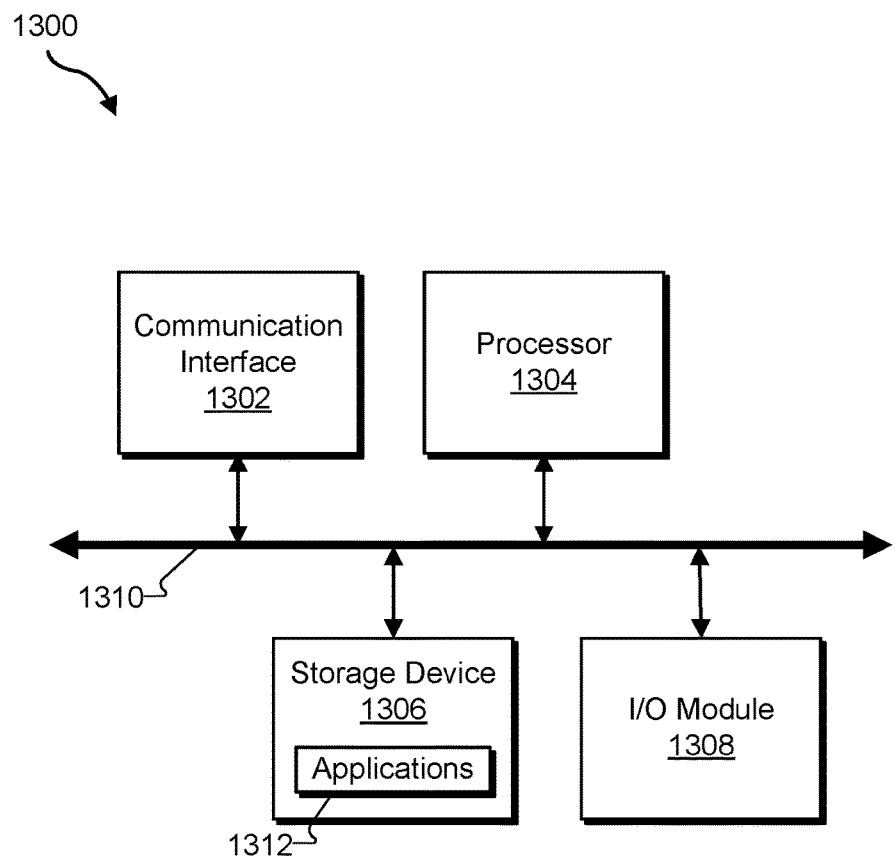
FIG. 13 illustrates an exemplary computing device according to principles described herein.

FIG. 13 illustrates an exemplary computing device 1300 that may be specifically configured to perform one or more of the processes described herein. As shown in FIG. 13, computing device 1300 may include a communication interface 1302, a processor 1304, a storage device 1306, and an input/output ("I/O") module 1308 communicatively connected via a communication infrastructure 1310. While an exemplary computing device 1300 is shown in FIG. 13, the components illustrated in FIG. 13 are not intended to be limiting. Additional or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, an audio/video connection, and any other suitable interface.

Processor 1304 generally represents any type or form of processing unit capable of processing data or interpreting, executing, and/or directing execution of one or more of the instructions, processes, and/or operations described herein. Processor 1304 may direct execution of operations in accordance with one or more applications 1312 or other computer-executable instructions such as may be stored in storage device 1306 or another computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1306. For example, data representative of one or more executable applications 1312 configured to direct processor 1304 to perform any of the operations described herein may be stored within storage device 1306. In some examples, data may be arranged in one or more databases residing within storage device 1306.

I/O module 1308 may be configured to receive user input and provide user output and may include any hardware, firmware, software, or combination thereof supportive of input and output capabilities. For example, I/O module 1308 may include hardware and/or software for capturing user input, including, but not limited to, a keyboard or keypad, a touchscreen component (e.g., touchscreen display), a receiver (e.g., an RF or infrared receiver), and/or one or more input buttons.

I/O module 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1300. For example, one or more applications 1312 residing within storage device 1306 may be configured to direct processor 1304 to perform one or more processes or functions associated with media content management facility 202 or data communication facility 204 of local media content server 200 (see FIG. 2), media content playback facility 302, local proxy server facility 304, or data communication facility 306 of media content playback device 300 (see FIG. 3), and/or management facility 402, hardware transcoding resources 404, or data communication facility 406 (see FIG. 4). Likewise, one or more of storage facilities 206, 308, and 408 may be implemented by or within storage device 1306.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   recording, by a local media content server located at a user premises of a user of the local media content server, a media content program;
   dividing, by the local media content server, the media content program into a plurality of program segments, each program segment comprising a different portion of the media content program;
   generating, by the local media content server, a program segment playlist including pointers to the plurality of program segments of the media content program, the pointers including data uniquely identifying, to a cloud-based transcoding system located remotely from the user premises and configured to concurrently transcode the plurality of program segments by transcoding at least two of the plurality of program segments in parallel, the local media content server that recorded the media content program of which each program segment comprises a different portion;
   receiving, by the local media content server, a request for a media content playback device associated with the user to download the media content program;
   transmitting, by the local media content server to the media content playback device in response to the request for the media content playback device associated with the user to download the media content program, the program segment playlist including the pointers to the plurality of program segments of the media content program; and
   uploading, by the local media content server and in response to the cloud-based transcoding system receiving a request for transcoded versions of the plurality of program segments of the media content program from the media content playback device, non-transcoded versions of the plurality of program segments of the media content program to the cloud-based transcoding system;
   wherein the program segment playlist transmitted to the media content playback device is configured to cause the media content playback device to
      send the request for the transcoded versions of the plurality of program segments to the cloud-based transcoding system, the request for the transcoded versions based on the data uniquely identifying the local media content server to the cloud-based transcoding system included in the pointers included in the program segment playlist, and
      download the transcoded versions of the plurality of program segments from the cloud-based transcoding system after the cloud-based transcoding system has downloaded the non-transcoded versions of the plurality of program segments from the local media content server and generated the transcoded versions of the plurality of program segments based on the non-transcoded versions of the plurality of program segments.

2. The method of claim 1, wherein the media content playback device comprises at least one non-transitory computer-readable medium embodying computer-executable instructions to implement:
  a local proxy server facility configured to perform the sending of the request for the transcoded versions of the plurality of program segments of the media content program to the cloud-based transcoding system; and
  a media content playback facility configured to
    access, via the local proxy server facility, the transcoded versions of the plurality of program segments, and
    play back the media content program for the user by continuously playing back each of the transcoded versions of the plurality of program segments of the media content program in a sequence based on the program segment playlist.

3. The method of claim 2, wherein the sending of the request for the transcoded versions of the plurality of program segments by the media content playback device includes:
  receiving, by the local proxy server facility from the media content playback facility, a first pointer to a first program segment from the pointers to the plurality of program segments of the media content program included in the program segment playlist;
  determining, by the local proxy server facility, that a first transcoded version of the first program segment referenced by the first pointer is not stored on the media content playback device; and
  requesting, by the local proxy server facility from the cloud-based transcoding system, the first transcoded version of the first program segment referenced by the first pointer.

4. The method of claim 3, wherein the sending of the request for the transcoded versions of the plurality of program segments by the media content playback device further includes:
  receiving, by the local proxy server facility from the media content playback facility, a second pointer to a second program segment from the pointers to the plurality of program segments of the media content program included in the program segment playlist;
  determining, by the local proxy server facility, that a second transcoded version of the second program segment referenced by the second pointer is not stored on the media content playback device; and
  requesting, by the local proxy server facility from the cloud-based transcoding system, the second transcoded version of the second program segment referenced by the second pointer,
  wherein the cloud-based transcoding system generates the first and second transcoded versions of the program segments referenced by the first and second pointers by concurrently transcoding the first and second program segments referenced by the first and second pointers.

5. The method of claim 2, wherein each pointer in the pointers included in the program segment playlist includes a uniform resource locator (URL) having a hostname and a file identifier, the hostname corresponding to the local proxy server facility and the file identifier corresponding to a respective program segment included in the plurality of program segments.

6. The method of claim 5, wherein the file identifier includes:
  data uniquely identifying the respective program segment included in the plurality of program segments, and
  the data uniquely identifying, to the cloud-based transcoding system, the local media content server that recorded the media content program of which each program segment comprises a different portion.

7. The method of claim 1, wherein the media content playback device is located at the user premises of the user and is communicatively coupled to the local media content server via a local area network associated with the user premises.

8. The method of claim 1, wherein the media content playback device is located remotely from the user premises of the user.

9. The method of claim 1, embodied as computer-executable instructions on at least one non-transitory computer-readable medium.

10. A method comprising:
  receiving, by a cloud-based transcoding system from a media content playback device, a request for transcoded versions of a plurality of program segments of a media content program, wherein
    each program segment within the plurality of program segments comprises a different portion of the media content program,
    the request for the transcoded versions includes data uniquely identifying, to the cloud-based transcoding system, a local media content server that has recorded the media content program of which each program segment comprises a different portion, the local media content server located at a user premises of a user of the local media content server, and
    the request for the transcoded versions is based on the data uniquely identifying the local media content server, the data included in pointers to the plurality of program segments of the media content program and the pointers included in a program segment playlist transmitted from the local media content server to the media content playback device in response to a request to download the media content program to the media content playback device;
  downloading, by the cloud-based transcoding system in response to the request for the transcoded versions of the plurality of program segments of the media content program, non-transcoded versions of the plurality of program segments from the local media content server;
  concurrently generating, by the cloud-based transcoding system, the transcoded versions of the plurality of program segments of the media content program by transcoding at least two of the non-transcoded versions of the plurality of program segments downloaded from the local media content server in parallel; and
  transmitting, by the cloud-based transcoding system to the media content playback device in response to the request for the transcoded versions of the plurality of program segments of the media content program, the transcoded versions of the plurality of program segments.

11. The method of claim 10, wherein the downloading of the non-transcoded versions of the plurality of program segments comprises:
  establishing a connection with the local media content server that has recorded the media content program; and downloading the plurality of program segments from the local media content server.

12. The method of claim 10, wherein the cloud-based transcoding system includes a plurality of hardware transcoding resources configured to perform the concurrent generation of the transcoded versions of the plurality of program segments of the media content program by transcoding the at least two program segments of the plurality of program segments in parallel.

13. The method of claim 12, wherein the hardware transcoding resources are further configured to concurrently generate transcoded versions of a second plurality of program segments of a second media content program accessed from a second local media content server by transcoding at least two other program segments of the second plurality of program segments in parallel with one another and with the transcoding of the at least two program segments of the plurality of program segments accessed from the local media content server.

14. The method of claim 10, embodied as computer-executable instructions on at least one non-transitory computer-readable medium.

15. A local media content server comprising:
at least one physical computing device that:
records a media content program;
divides the media content program into a plurality of program segments, each program segment comprising a different portion of the media content program;
generates a program segment playlist including pointers to the plurality of program segments of the media content program, the pointers including data uniquely identifying, to a cloud-based transcoding system located remotely from user premises at which the local media content server is located and configured to concurrently transcode the plurality of program segments by transcoding at least two of the plurality of program segments in parallel, the local media content server that comprises the at least one physical computing device;
receives a request for a media content playback device associated with a user of the local media content server to download the media content program;
transmits, to the media content playback device in response to the request for the media content playback device associated with the user to download the media content program, the program segment playlist including the pointers to the plurality of program segments of the media content program; and
uploads, in response to the cloud-based transcoding system receiving a request for transcoded versions of the plurality of program segments of the media content program from the media content playback device, non-transcoded versions of the plurality of program segments of the media content program to the cloud-based transcoding system;
wherein the program segment playlist transmitted to the media content playback device is configured to cause the media content playback device to
send the request for the transcoded versions of the plurality of program segments to the cloud-based transcoding system, the request for the transcoded versions based on the data uniquely identifying the local media content server to the cloud-based transcoding system included in the pointers included in the program segment playlist, and
download the transcoded versions of the plurality of program segments from the cloud-based transcoding system after the cloud-based transcoding system has downloaded the non-transcoded versions of the plurality of program segments from the local media content server and generated the transcoded versions of the plurality of program segments based on the non-transcoded versions of the plurality of program segments.

16. The local media content server of claim 15, wherein the media content playback device comprises at least one non-transitory computer-readable medium embodying computer-executable instructions to implement:
a local proxy server facility configured to perform the sending of the request for the transcoded versions of the plurality of program segments of the media content program to the cloud-based transcoding system; and
a media content playback facility configured to
access, via the local proxy server facility, the transcoded versions of the plurality of program segments, and
play back the media content program for the user by continuously playing back each of the transcoded versions of the plurality of program segments of the media content program in a sequence based on the program segment playlist.

17. The local media content server of claim 16, wherein the sending of the request for the transcoded versions of the plurality of program segments by the media content playback device includes:
receiving, by the local proxy server facility from the media content playback facility, a first pointer to a first program segment from the pointers to the plurality of program segments of the media content program included in the program segment playlist;
determining, by the local proxy server facility, that a first transcoded version of the first program segment referenced by the first pointer is not stored on the media content playback device; and
requesting, by the local proxy server facility from the cloud-based transcoding system, the first transcoded version of the first program segment referenced by the first pointer.

18. The local media content server of claim 17, wherein the sending of the request for the transcoded versions of the plurality of program segments by the media content playback device further includes:
receiving, by the local proxy server facility from the media content playback facility, a second pointer to a second program segment from the pointers to the plurality of program segments of the media content program included in the program segment playlist;
determining, by the local proxy server facility, that a second transcoded version of the second program segment referenced by the second pointer is not stored on the media content playback device; and
requesting, by the local proxy server facility from the cloud-based transcoding system, the second transcoded version of the second program segment referenced by the second pointer,
wherein the cloud-based transcoding system generates the first and second transcoded versions of the program segments referenced by the first and second pointers by concurrently transcoding the first and second program segments referenced by the first and second pointers.

19. The local media content server of claim 15, wherein each pointer in the pointers included in the program segment playlist includes a uniform resource locator (URL) having a hostname and a file identifier, the hostname corresponding to the local proxy server facility and the file identifier corresponding to a respective program segment included in the plurality of program segments.

20. The local media content server of claim 19, wherein the file identifier includes:
   data uniquely identifying the respective program segment included in the plurality of program segments, and
   the data uniquely identifying, to the cloud-based transcoding system, the local media content server that recorded the media content program of which each program segment comprises a different portion.

* * * * *